United States Patent [19]

Stell

[11] 4,317,356

[45] Mar. 2, 1982

[54] METHOD OF AND APPARATUS FOR FORGING A CONSTANT-VELOCITY BALL-TYPE UNIVERSAL JOINT

[75] Inventor: Karl-Wilhelm Stell, Stadtlohn, Fed. Rep. of Germany

[73] Assignee: Metallumform Hubert Eing, Gescher, Fed. Rep. of Germany

[21] Appl. No.: 101,141

[22] Filed: Dec. 7, 1979

[30] Foreign Application Priority Data

Dec. 9, 1978 [DE] Fed. Rep. of Germany ....... 2853230

[51] Int. Cl.³ .............................................. B21D 22/00
[52] U.S. Cl. ...................................... 72/355; 72/353; 72/358
[58] Field of Search .................................. 72/353–358

[56] References Cited

U.S. PATENT DOCUMENTS

| 373,855 | 11/1887 | Rung ..................................... 72/355 |
| 3,271,939 | 9/1966 | Paddock .............................. 72/356 |
| 3,706,120 | 12/1972 | Bulgrin ................................. 72/355 |
| 3,999,417 | 12/1976 | Orain .................................... 72/353 |

*Primary Examiner*—Leon Gilden
*Attorney, Agent, or Firm*—Karl F. Ross

[57] ABSTRACT

A half of a constant-velocity ball-type universal joint is made by substantially confining a workpiece blank in a cavity between a pair of forging dies without substantial deformation of the blank. Then a plurality of race-forming tools are introduced into the cavity through guides in the dies and these tools are blocked in place therein. The blank is then forged against the tools and against the cavity to impart to it the shape of the cavity and of the tools. Then the tools are withdrawn from the cavity and the dies are separated so that the forged workpiece can be removed from it.

10 Claims, 4 Drawing Figures

METHOD OF AND APPARATUS FOR FORGING A CONSTANT-VELOCITY BALL-TYPE UNIVERSAL JOINT

FIELD OF THE INVENTION

The present invention relates to a method of and an apparatus for forging the main parts of a constant-velocity ball-type universal joint. More particularly this invention concerns such a method and apparatus specifically aimed at the forging of the parts of such a joint which are themselves formed with races for the balls of the joint.

BACKGROUND OF THE INVENTION

Ball-type constant-velocity universal joints are known wherein the drive member and driven member, which rotate about intersecting angles, are both formed with ball races. The ball races of one member open outwardly and the ball races of the other member open inwardly, so that balls each received halfway in a race of the one member and halfway in a race of the other member are used to transmit angular force between these two members. Such universal joints are used frequently in a motor vehicle, one at the rear end of the transmission and another at the input side of the differential at the rear axle.

Typically the halves of such a universal joint are formed by forging. Thus a workpiece blank corresponding roughly to the shape desired is fitted between a pair of forging dies which are then pressed together so as to forge the desired shape in the universal-joint half. Such cold working produces a workpiece that is very strong.

If the races are to extend along skew axes relative to the center axis of such a universal-joint half, it is impossible to form these races in the universal-joint half by forging. Forming the inside of the forging dies with grooves to form the races would be out of the question, as since these ridges would have to extend at an angle to the opening and closing direction of the dies, the forged workpiece could not be separated from the dies once completed. In fact it would be impossible to open the dies at all without damaging the workpiece or the dies. For this reason in this type of arrangement the races are machined into the forged workpiece after the forging operation.

It is, however, possible to form races in the dies by forging the races directly into the workpiece during the forging operation in situations where the races extend parallel to the opening and closing of the dies. Such an arrangement invariably leaves a ridge or rib along the closing plane of the die in each of the races. This ridge or rib must be removed completely, so that it is necessary in any case to subject the forged workpiece to a subsequent machining operation. Obviously the cost of such machining elevates the price of the finished workpiece.

OBJECTS OF THE INVENTION

It is therefore an object of the present invention to provide an improved method of and apparatus for making a half of a constant-velocity ball-type universal joint.

Another object is the provision of such a method and apparatus allowing a universal joint of this type to be made at relatively low cost.

SUMMARY OF THE INVENTION

These objects are attained according to the instant invention in a method wherein the workpiece blank is substantially confined between a pair of forging dies without substantial deformation of the blank. Then, while the blank is maintained substantially confined in this cavity, a plurality of race-forming tools is introduced into the cavity and blocked therein. The blank is then formed against the tools and against the cavity to impart to it the shape of the cavity and of the tools. The tools are then withdrawn from the cavity while maintaining the blank substantially confined therein, and the dies are then separated to remove the forged blank from the cavity. This method has the considerable advantage that the tools can be introduced in any direction to extend in any direction, skew to the closing direction of the dies or even perpendicular thereto, yet will not interfere with subsequent removing of the workpiece from the die. Once the forging operation is completed the tools are withdrawn and the dies can be separated from each other to free the workpiece with no difficulty.

Even if the tools are displaced parallel to the axis, the instant invention produces races having no ridges or grooves so that the workpiece can be used directly, without finish-machining. The advantages of the system according to this invention are obtained for virtually all types of constant-velocity ball-type universal joints.

According to further features of this invention the two dies can each be formed with a plurality of cylindrical guide bores centered on respective axes and receiving respective cylindrical pins constituting the tools. Each of the dies may further be associated with a ring rotatable about an axis parallel to the closing direction of the die, and having inclined camming surfaces that are operatively engageable with the rods. Thus when the rings are rotated the rods are advanced into or withdrawn from the cavity with considerable force.

It is also possible, when the instant invention is aimed at producing an inner joint part, to make the tools perfectly radially displaceable in a part of one of the dies that is received substantially within the cavity when the dies are engaged together. Once again the tools are displaced radially outwardly before the forging operation commences, and blocked rigidly in place so that the workpiece, during subsequent forging, is shaped to conform to these radially displaceable tools.

SPECIFIC DESCRIPTION

Figure 1:
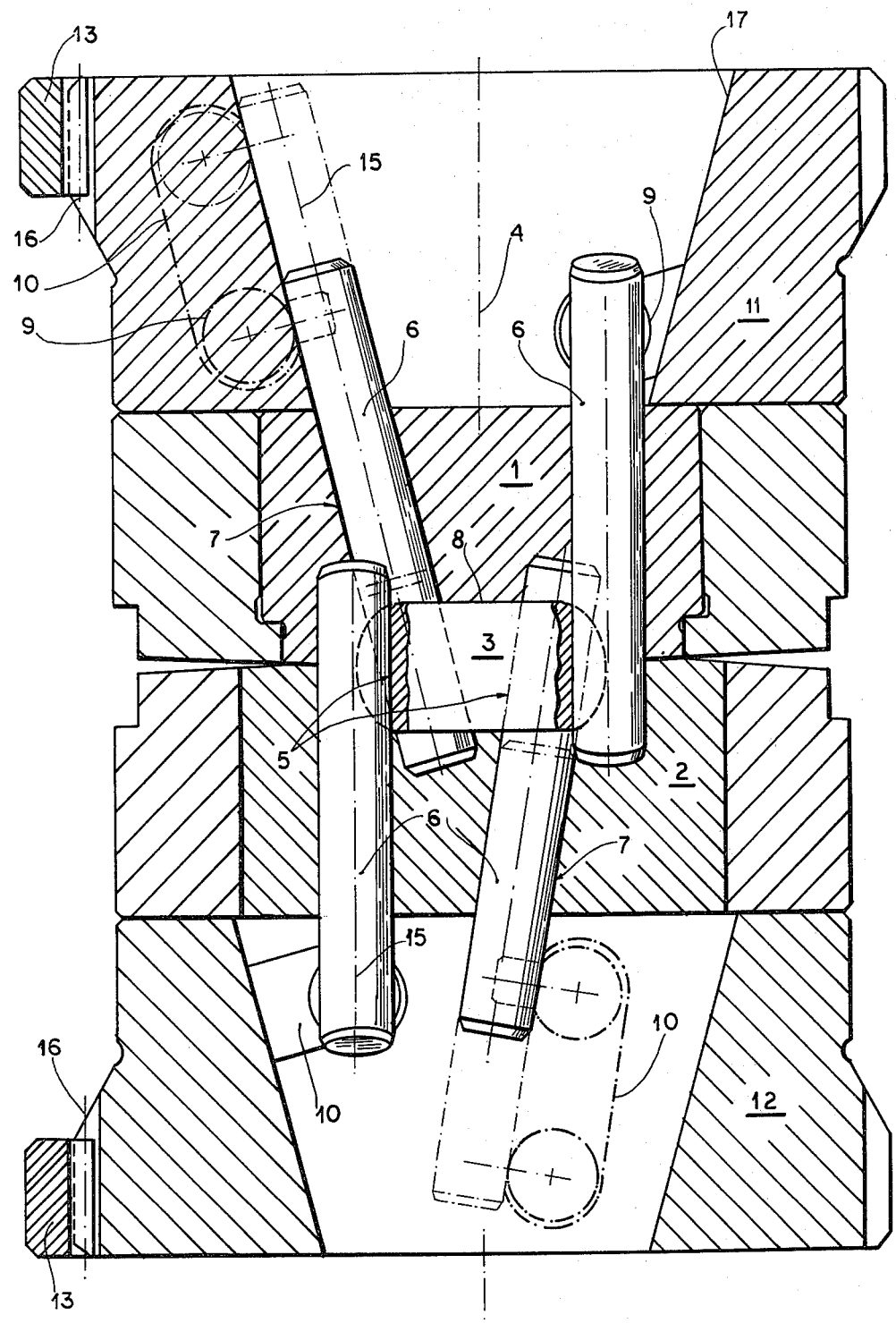
FIG. 1 is an axial section through a die assembly according to this invention.
Figure 2:
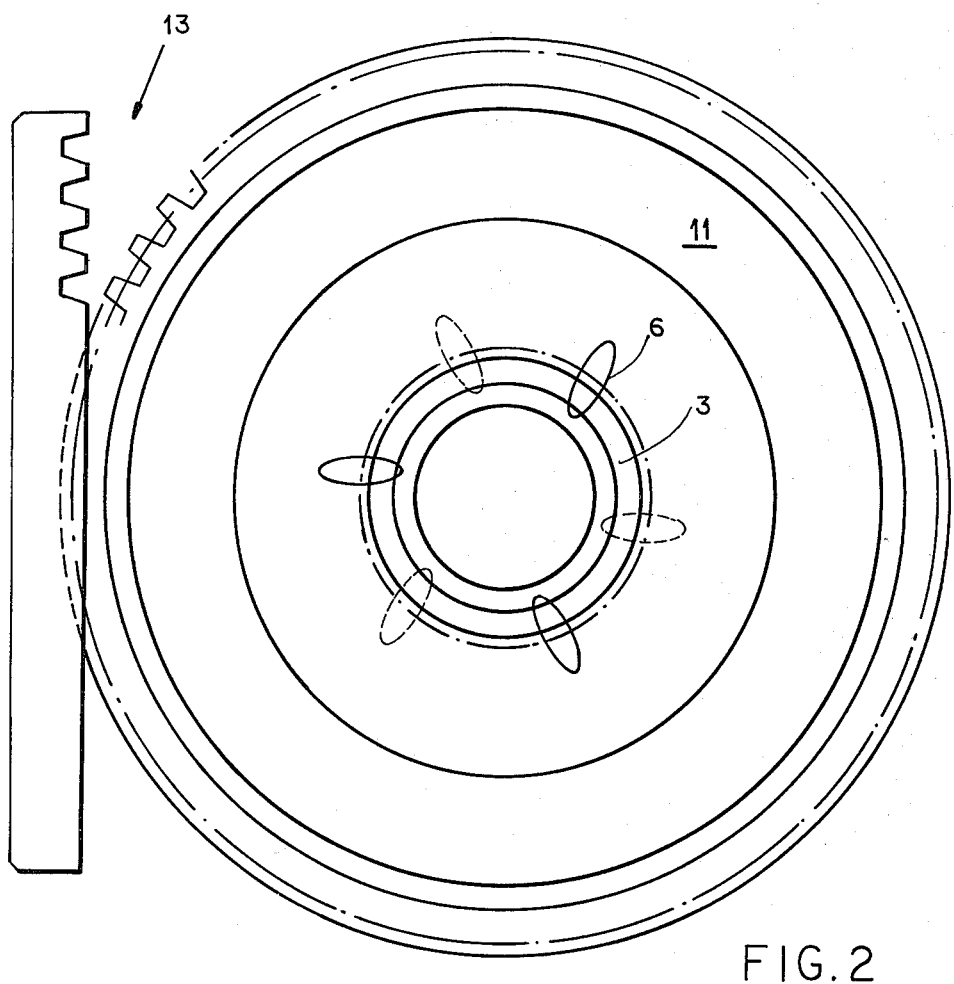
FIG. 2 is a top partly schematic view illustrating the assembly of FIG. 1.
Figure 3:
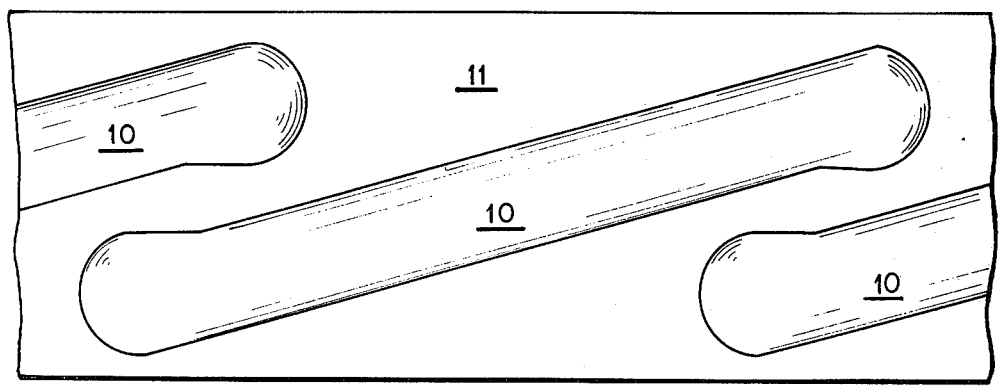
FIG. 3 is a developed view showing a portion of the assembly of FIG. 1.

The die assembly shown in FIGS. 1–3 basically comprises an upper die 1 and a lower die 2 engageable together along an axis 4 to form a compartment 8 in which a workpiece 3 is loosely receivable. According to this invention the workpiece 3 is to be formed with grooves or races 5 intended to eventually receive balls of a ball-type universal joint, with the workpiece 3 secured to the driving or driven member of the joint.

According to this invention the dies 1 and 2 are each formed with three cylindrical guide passages 7 centered on respective axes 15 extending skew to the axis 4, that is neither parallel to nor intersecting this axis 4. Each of these cylindrical guides 7 receives a respective rod 6 having at its outer end a pin 9 received in an inclined groove 10 of a respective ring 11 or 12. Racks 13 engage teeth 16 of these rings 11 and 12 to rotate them about the axis 4. In addition these rings 11 and 12 are formed with tapered throughgoing passages 17 along whose inner surfaces ride the outer ends of the rods 6.

According to the instant invention a workpiece 3 is introduced between the two dies 1 and 2 when they are separated from each other along the axis 4, in a position with the pins 9 of the upper tools 6 engaged at the upper ends of the respective grooves 10 and the pins 9 of the lower tools 6 engaged in the lower ends of the respective inclined guide grooves 10 so that the inner ends of these tools 6 are completely out of the compartment or cavity 8. The dies 1 and 2 are then displaced together so as to hold the workpiece blank 3 tightly in the cavity 8, without, however, substantial deformation of this blank. Then the two rings 11 and 12 are rotated by means of their respective racks 13 to displace the rods 6 inwardly into the position illustrated in solid lines in FIG. 1.

Thereafter the forging operation continues until the blank 3 has been shaped to conform to the interior of the cavity 8 and of the portions of the tools 6 exposed therein. Upon completion of the forging operation the tools 6 are withdrawn by opposite rotation of the respective rings 11 and 12, and the two dies can be displaced apart, normally by means of a powerful hydraulic ram connected to the upper die 1, the lower die 2 being fixed on a support. The result is a finished workpiece having forged races 5 that correspond exactly to the shape of the tool-steel pins 6 so that no subsequent machining is necessary.

Figure 4:
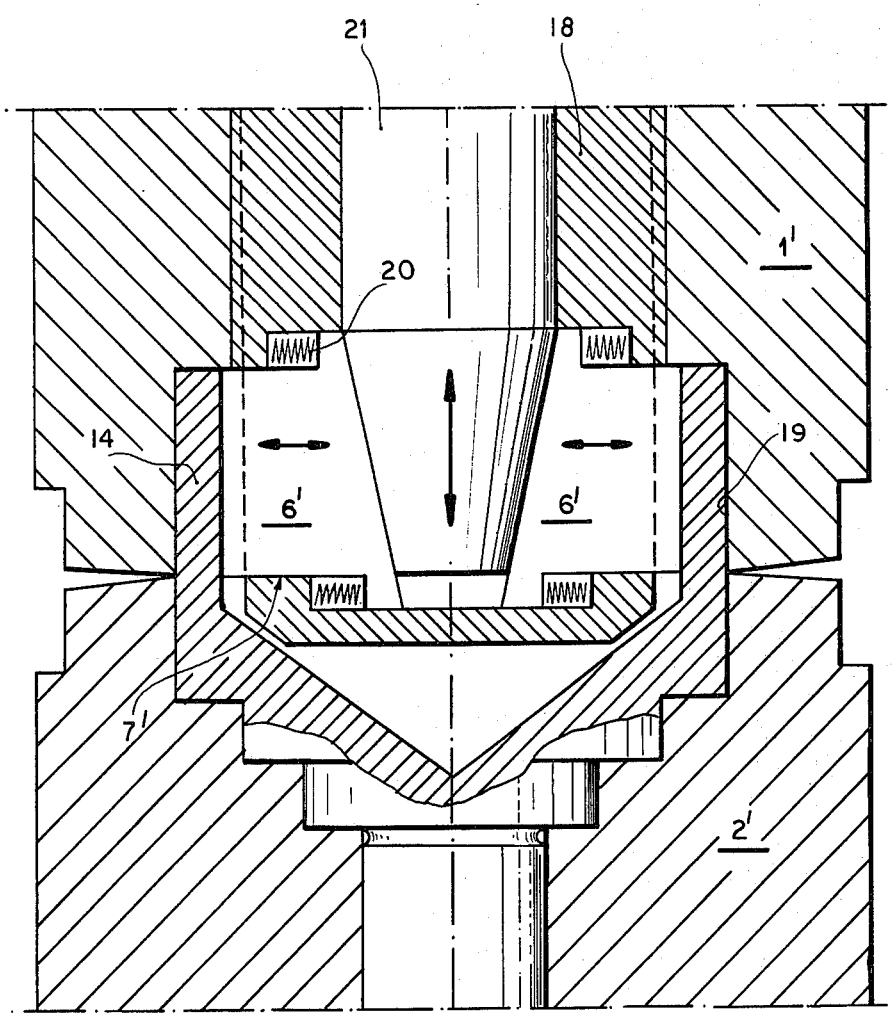
FIG. 4 is an axial section through another assembly for carrying out the method of this invention.

FIG. 4 shows another arrangement wherein an upper die part 1' has a portion 18 fittable into a cavity 19 formed with a lower die part 2'. The part 18 is formed with guides 7' for radially displaceable tools 6', urged radially inwardly by springs 20. In addition a pin 21 with a tapered end can be engaged axially inwardly through the part 18 to displace these tools 6' radially outwardly.

The operation for the embodiment of FIG. 4 is substantially identical to that of FIGS. 1–3. A hollow workpiece 14 is placed between the two dies 1' and 2', whereupon the tools 6' are displaced outwardly. Then the workpiece 14 is forged. After this operation the pin 21 is withdrawn to allow the springs 20 to withdraw the tools 6' radially inwardly, and the two dies 1' and 2' are separated.

Thus with the system according to the instant invention it is possible to form the inner and outer parts of a constant-velocity ball-type universal joint with a forging operation exclusively. Of course subsequent finish machining is frequently advisable for any workpiece, yet with the system according to the instant invention the cost of such an operation will be minimized.

I claim:

1. A method of making a half of a constant-velocity ball-type universal joint, said method comprising the steps of:
   substantially confining a workpiece blank in a cavity between a pair of relatively axially displaceable forging dies without substantial deformation of said blank;
   thereafter nonaxially displacing a plurality of race-forming tools into said cavity and blocking said tools in place therein while maintaining said blank substantially confined in said cavity;
   thereafter displacing said dies axially toward each other and thereby forging said blank against said tools and against said cavity to impart to said blank the shape of said cavity and of said tools;
   thereafter nonaxially displacing said tools out of said cavity while maintaining said blank confined in said cavity; and
   thereafter axially separating said dies and removing the forged blank from said cavity.

2. The method defined in claim 1 wherein said tools are rods introduced longitudinally along respective rod axes skew to the direction of displacement of said dies relative to eath other during closing and opening.

3. The method defined in claim 1 wherein said tools are displaced generally radially in said cavity.

4. A die assembly for making a half of a constant-velocity ball-type universal joint, said assembly comprising:
   a pair of dies engageable together in a predetermined direction to form a cavity;
   a plurality of guides extending along respective guide axes nonparallel to said direction in at least one of said dies;
   respective race-forming tools displaceable axially in said guides into and out of said cavity;
   means for displacing said race-forming tools along the respective guide axes into said cavity when said dies are substantially engaged together and when a workpiece blank is engaged in said cavity; and
   means for displacing said dies in said direction toward each other when said tools are in said cavity and a workpiece blank is in said cavity to forge said blank against said tools and dies.

5. The assembly defined in claim 4 wherein said guides are substantially cylindrical passages formed in said dies and said tools are substantially cylindrical rods.

6. The assembly defined in claim 5 wherein said means for displacing said tools includes at least one ring rotatable about an axis parallel to said direction and having a plurality of inclined camming surfaces respectively operatively engageable with said rods.

7. The assembly defined in claim 6 wherein said means for displacing said tools includes teeth formed on said ring and a toothed rack in mesh with said teeth.

8. The assembly defined in claim 5 wherein one of said dies is formed with some of said guides and the other of said dies is formed with the rest of said guides.

9. The assembly defined in claim 5 wherein said guide axes extend skew to said direction.

10. The assembly defined in claim 4 wherein said tools are displaceable substantially radially of said direction in one of said dies, said one die being generally within the other die when said dies are engaged together.

* * * * *